(12) United States Patent
Inoue et al.

(10) Patent No.: US 9,701,311 B2
(45) Date of Patent: Jul. 11, 2017

(54) CONTROLLER FOR VEHICLE

(71) Applicant: TOYOTA JIDOSHA KABUSHIKI KAISHA, Toyota-shi, Aichi-ken (JP)

(72) Inventors: Yuji Inoue, Nissin (JP); Hirofumi Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/931,180

(22) Filed: Nov. 3, 2015

(65) Prior Publication Data

US 2016/0129909 A1   May 12, 2016

(30) Foreign Application Priority Data

Nov. 6, 2014   (JP) .................................. 2014-226521

(51) Int. Cl.
*B60W 10/06* (2006.01)
*B60W 10/11* (2012.01)
(Continued)

(52) U.S. Cl.
CPC ............ *B60W 30/18* (2013.01); *B60W 10/06* (2013.01); *B60W 10/10* (2013.01); *F16H 61/0021* (2013.01); *F16H 61/686* (2013.01); *B60W 2710/1005* (2013.01); *B60W 2710/1083* (2013.01); *F16H 2312/14* (2013.01)

(58) Field of Classification Search
None
See application file for complete search history.

(56) References Cited

U.S. PATENT DOCUMENTS

| | | | |
|---|---|---|---|
| 5,335,568 A * | 8/1994 | Kammerl | B60W 10/06 477/109 |
| 2009/0011895 A1* | 1/2009 | Tabata | B60K 6/445 477/3 |

(Continued)

FOREIGN PATENT DOCUMENTS

| | | |
|---|---|---|
| JP | H11-13787 A | 1/1999 |
| JP | 2009/264545 A | 11/2009 |

(Continued)

*Primary Examiner* — Edwin A Young
(74) *Attorney, Agent, or Firm* — Oliff PLC

(57) ABSTRACT

A controller for vehicle, the vehicle including plural engagement elements for performing engagement operation by hydraulic pressure, the plural engagement elements having a common engagement element being an engagement element common to plural transmission gear stages, the common engagement element being an engagement element that is brought into an engaged state for establishing a transmission gear stage immediately before start of economic running and a transmission gear stage immediately after cancellation of the economic running, the controller includes at least one electronic control unit configured to stop an engine in the case where a specified economic running start condition is established and switch the plural engagement elements between the engaged states and disengaged states such that the common engagement element is switched from the engaged state to the disengaged state after another engagement element that is brought into the engaged state together with the common engagement element.

6 Claims, 9 Drawing Sheets

(51) Int. Cl.
  *B60W 30/18*  (2012.01)
  *B60W 10/10*  (2012.01)
  *F16H 61/00*  (2006.01)
  *F16H 61/686*  (2006.01)

(56) References Cited

U.S. PATENT DOCUMENTS

| | | | |
|---|---|---|---|
| 2009/0259354 A1* | 10/2009 | Krupadanam | B60W 10/06 701/22 |
| 2009/0271079 A1 | 10/2009 | Kobayashi et al. | |
| 2012/0067685 A1 | 3/2012 | Ohashi et al. | |
| 2013/0261910 A1 | 10/2013 | Ichikawa et al. | |
| 2014/0172257 A1 | 6/2014 | Yamanaka et al. | |
| 2015/0260281 A1 | 9/2015 | Tsuda et al. | |

FOREIGN PATENT DOCUMENTS

| | | |
|---|---|---|
| WO | 2013/114623 A1 | 8/2013 |
| WO | 2014/104133 A1 | 7/2014 |

\* cited by examiner

FIG. 2

| GS | C1 | C2 | B1 | B2 | B3 | F1 |
|---|---|---|---|---|---|---|
| 1ST | ○ | | | ◎ | | △ |
| 2ND | ○ | | ○ | | | |
| 3RD | ○ | | | | ○ | |
| 4TH | ○ | ○ | | | | |
| 5TH | | ○ | | | ○ | |
| 6TH | | ○ | ○ | | | |
| R | | | | ○ | ○ | |
| N | | | | | | |

◎ OPERATED DURING ENGINE BRAKE
△ OPERATED ONLY DURING DRIVING

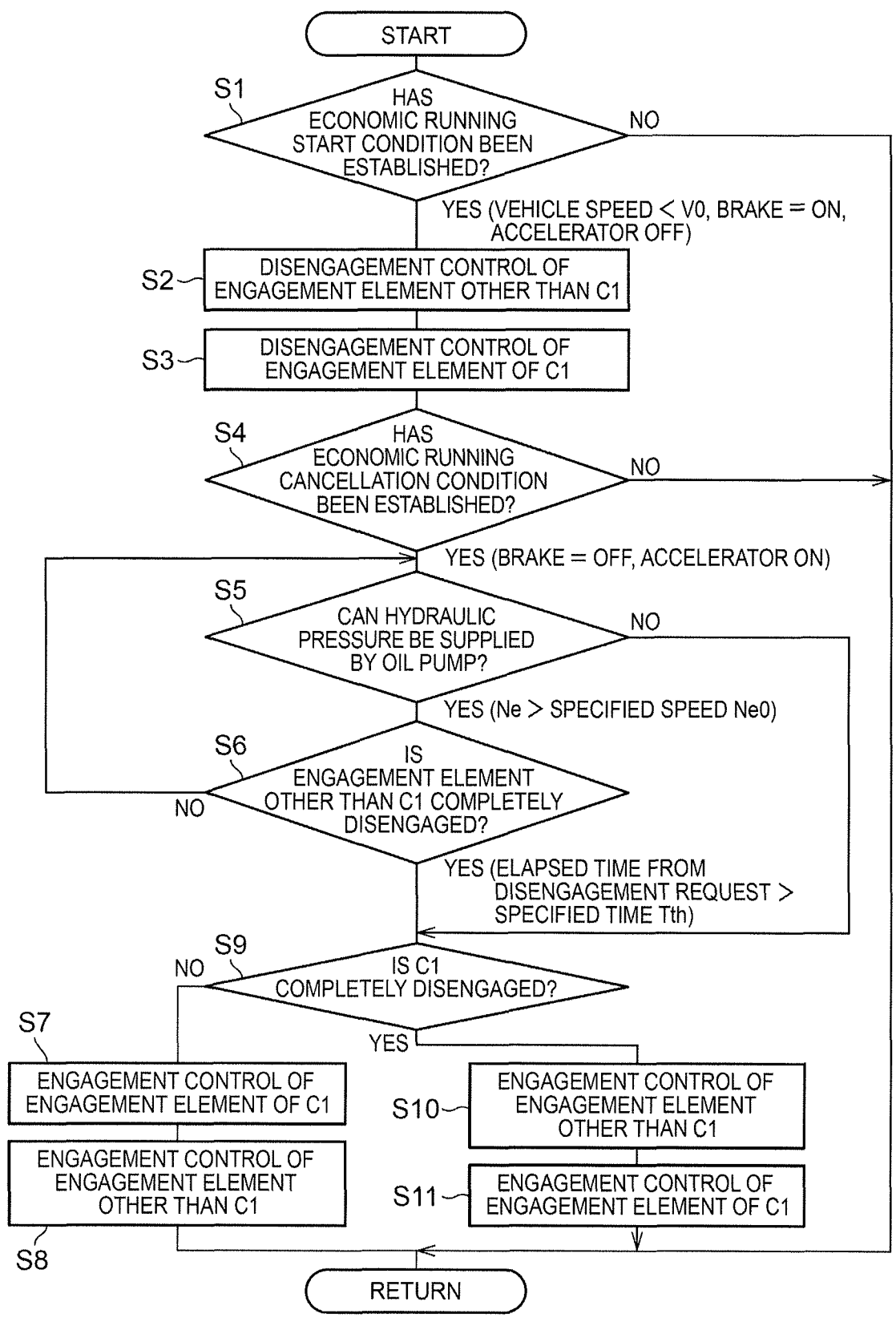

CONTROLLER FOR VEHICLE

INCORPORATION BY REFERENCE

The disclosure of Japanese Patent Application No. 2014-226521 filed on Nov. 6, 2014 including the specification, drawings and abstract is incorporated herein by reference in its entirety.

BACKGROUND OF THE INVENTION

1. Field of the Invention

The invention relates to a technique of controlling hydraulic pressure to an engagement element.

2. Description of Related Art

Among vehicles that have plural engagement elements and a solenoid valve for selecting supply/discharge of hydraulic pressure to/from these engagement elements and in which the hydraulic pressure is supplied to this solenoid valve, a vehicle that includes an economic running system for automatically stopping an engine when a specified economic running condition related to an engine operation state or a vehicle travel state is established has been well known.

For example, an oil pump is provided in a torque converter in a vehicle described in Japanese Patent Application Publication No. 11-013787 (JP 11-013787 A). When the specified economic running condition is established, the engine is automatically stopped, and thus an engine speed is reduced. In conjunction with this, an amount of the hydraulic pressure that is supplied from the oil pump to the engagement elements is reduced.

SUMMARY OF THE INVENTION

By the way, JP 11-013787 A discloses that a disengagement operation of the engagement elements is performed when the economic running condition is established. However, it is not described from which of the engagement elements the disengagement operation is performed when the economic running condition is established. For example, in the case where hydraulic pressure of a common engagement element that is common to a transmission gear stage immediately before a start of economic running and a transmission gear stage immediately after cancellation of the economic running is released sooner (reduced sooner) than hydraulic pressure of the other engagement element, there is a higher possibility that an economic running cancellation condition is established in a state where the hydraulic pressure of the common engagement element remains (in a state where the hydraulic pressure is maintained) than a case where the hydraulic pressure of the common engagement element is released later (reduced later) than the hydraulic pressure of the other engagement element. For example, in the case where the economic running cancellation condition is established in a state where the hydraulic pressure of the common engagement element is completely released (in a state where the hydraulic pressure is reduced completely), the hydraulic pressure has to be supplied to the common engagement element, which has to be brought into an engaged state to establish the transmission gear stage immediately after the cancellation of the economic running, so as to bring the common engagement element into an engaged state from a disengaged state in which the hydraulic pressure is completely released (the disengagement state in which the hydraulic pressure is reduced completely). Thus, a time lag possibly occurs until a desired transmission gear stage immediately after the establishment of the economic running cancellation condition is set.

A controller for a vehicle according to one aspect of the invention, the vehicle including a plurality of engagement elements for performing an engagement operation by hydraulic pressure, the plurality of engagement elements having a first engagement element (a common engagement element) and a second engagement element (another engagement element), a transmission gear state being established by engaging the first engagement element and engaging the second engagement element, the first engagement element being an engagement element common to a plurality of transmission gear stages, the first engagement element being an engagement element to be brought into an engaged state for establishing a transmission gear stage immediately before a start of economic running and a transmission gear stage immediately after cancellation of the economic running, the controller includes at least one electronic control unit configured to i) stop an engine and ii) switch the plurality of engagement elements between the engaged states and disengaged states, when a specified economic running start condition is established, such that the first engagement element is started to be switched from the engaged state to the disengaged state after the second engagement element is started to be switched from the engaged state to the disengaged state.

In this way, in the controller for the vehicle according to the aspect of the invention, the common engagement element, which is common to the plural engagement elements and is brought into the engaged state in order to establish the transmission gear stage immediately before the start of the economic running and the transmission gear stage immediately after the cancellation of the economic running, is switched to the disengaged state after the other engagement element that is brought into the engaged state together with the common engagement element in order to establish the transmission gear stage immediately before the start of the economic running. In the case where the economic running start condition is thereby established, a disengagement operation of the common engagement element is delayed more than that of the other engagement element. Thus, release of the hydraulic pressure from the common engagement element can be delayed.

As a result, the controller for the vehicle according to the aspect of the invention can increase a possibility that the economic running cancellation condition is established in a state where the hydraulic pressure remains in the common engagement element. In the case where the economic running cancellation condition is established in the state where the hydraulic pressure remains in the common engagement element, an amount of the hydraulic pressure to be supplied in order to bring the common engagement element into the engaged state can be reduced. It is because the hydraulic pressure remains in the common engagement element when the engagement element, which is brought into the engaged state in order to establish the transmission gear stage immediately after the cancellation of the economic running, is engaged. Then, a surplus amount resulted from the reduction in the hydraulic pressure from the supply thereof to the common engagement element can be supplied as the hydraulic pressure that brings the other engagement element into the engaged state to another clutch. Thus, a desired transmission gear stage immediately after the cancellation of the economic running can promptly be set.

In the above aspect, the electronic control unit may be configured to switch a first command signal transmitted to a solenoid valve corresponding to the first engagement element and a second command signal transmitted to a solenoid valve corresponding to the second engagement element from signals for engagement to signals for disengagement when the specified economic running start condition is established such that the first command signal is switched from the signal for engagement to the signal for disengagement after the second command signal is switched from the signal for engagement to the signal for disengagement.

In this way, in the controller for the vehicle according to the aspect of the invention, the command signal of the common engagement element is shifted to the disengagement side after the command signal of the other engagement element. Accordingly, in the case where the economic running start condition is established, the disengagement operation of the common engagement element is delayed more than that of the other engagement element, and thus the release of the hydraulic pressure from the common engagement element can be delayed.

As a result, the controller for the vehicle according to the aspect of the invention can further increase the possibility that the economic running cancellation condition is established in the state where the hydraulic pressure remains in the common engagement element. Thus, the desired transmission gear stage immediately after the cancellation of the economic running can promptly be set.

In the above aspect, the electronic control unit may be configured to switch the first command signal from the signal for disengagement to the signal for engagement when an economic running cancellation condition is established within a specified time since the first command signal transmitted to the solenoid valve corresponding to the first engagement element is shifted from the signal for engagement to the signal for disengagement after the specified economic running start condition is established. In this way, the command signal is shifted to the engagement side, and thus the engagement operation of the common engagement element can be started before the hydraulic pressure of the common engagement element is completely released. Accordingly, a possibility that the common engagement element can be engaged again from a state where the hydraulic pressure remains therein is increased. As a result, in the case where the economic running cancellation condition is established in the state where the hydraulic pressure remains in the common engagement element, due to the remaining hydraulic pressure in the common engagement element, the amount of the hydraulic pressure that is used to bring the common engagement element into the engaged state can be reduced, and the surplus amount resulted from the reduction in the hydraulic pressure can be supplied as the hydraulic pressure that is used to bring the other engagement element into the engaged state. Thus, the desired transmission gear stage can promptly be set.

In the above aspect, the electronic control unit may be configured to switch the first command signal transmitted to the first engagement element and the second command signal transmitted to the second engagement element from the signals for disengagement to the signals for engagement after the economic running cancellation condition is established such that the first command signal is switched from the signal for disengagement to the signal for engagement prior to the second command signal. In this way, since the common engagement element can first be engaged again, a possibility that the common engagement element can be engaged again from the state where the hydraulic pressure remains therein is increased. As a result, in the case where the economic running cancellation condition is established in the state where the hydraulic pressure remains in the common engagement element, due to the remaining hydraulic pressure in the common engagement element, the amount of the hydraulic pressure that is used to bring the common engagement element into the engaged state can be reduced, and the surplus amount resulted from the reduction in the hydraulic pressure can be supplied as the hydraulic pressure that is used to bring the other engagement element into the engaged state. Thus, the desired transmission gear stage can promptly be set.

In the above aspect, the vehicle may include solenoid valves configured to control a supply of the hydraulic pressure to the plurality of engagement elements, the solenoid valve corresponding to the first engagement element may be configured to supply the hydraulic pressure to the first engagement element when the specified economic running start condition is established, and the solenoid valve corresponding to the second engagement element may be configured to block the supply of the hydraulic pressure to the second engagement element when the specified economic running start condition is established.

In this way, due to blockage of the supply of the hydraulic pressure to the other engagement element, the hydraulic pressure that is supplied to the common engagement element can be concentrated thereto, and thus the release of the hydraulic pressure from the common engagement element can be delayed. Accordingly, the possibility that the economic running cancellation condition is established in the state where the hydraulic pressure remains in the common engagement element can be increased. Thus, in the case where the economic running cancellation condition is established in the state where the hydraulic pressure remains in the common engagement element, due to the remaining hydraulic pressure in the common engagement element, the amount of the hydraulic pressure that is used to bring the common engagement element into the engaged state can be reduced, and the surplus amount resulted from the reduction in the hydraulic pressure can be supplied as the hydraulic pressure that is used to bring the other engagement element into the engaged state. Therefore, the desired transmission gear stage can promptly be set.

In the above aspect, the vehicle may include: an oil pump configured to supply the hydraulic pressure by rotary drive associated with rotation of the engine; and an accumulator configured to supply accumulated hydraulic pressure to the plurality of engagement elements. The accumulator may be configured to supply the hydraulic pressure to the first engagement element when the specified economic running start condition is established. In this way, the hydraulic pressure that is accumulated in advance can be supplied to the common engagement element. In addition, since the release of the hydraulic pressure of the common engagement element is delayed, the possibility that the economic running cancellation condition is established in the state where the hydraulic pressure remains in the common engagement element can be increased. As a result, in the case where the economic running cancellation condition is established in the state where the hydraulic pressure remains in the common engagement element, due to the remaining hydraulic pressure in the common engagement element, the amount of the hydraulic pressure that is used to bring the common engagement element into the engaged state can be reduced, and the surplus amount resulted from the reduction in the hydraulic pressure can be supplied as the hydraulic pressure that is used to bring the other engagement element into the engaged state. Thus, the desired transmission gear stage can promptly be set.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an operation table for explaining combinations of operations of friction engagement elements at a time that any of plural gear stages of the automatic transmission in FIG. 1 is established;

FIG. 4 is a block diagram for explaining a main part of an electric control system that is provided in the vehicle for controlling the automatic transmission in FIG. 1 and the like;

FIG. 9 is a flowchart for explaining a main part of a control operation of the electronic control unit in FIG. 4, that is, a control operation of the friction engagement element during the economic running.

DETAILED DESCRIPTION OF EMBODIMENTS

In the invention, the vehicle is preferably a vehicle provided with an automatic transmission that functions as a transmission in a power transmission passage between an engine and drive wheels. The engine is an internal combustion engine such as a gasoline engine or a diesel engine for generating power from combustion of fuel, for example. The automatic transmission is a planetary-gear-type transmission, a synchromesh parallel-biaxial-type automatic transmission, a DCT, or the like.

A detailed description will hereinafter be made on embodiments of the invention with reference to the drawings.

Embodiment 1

Figure 1:
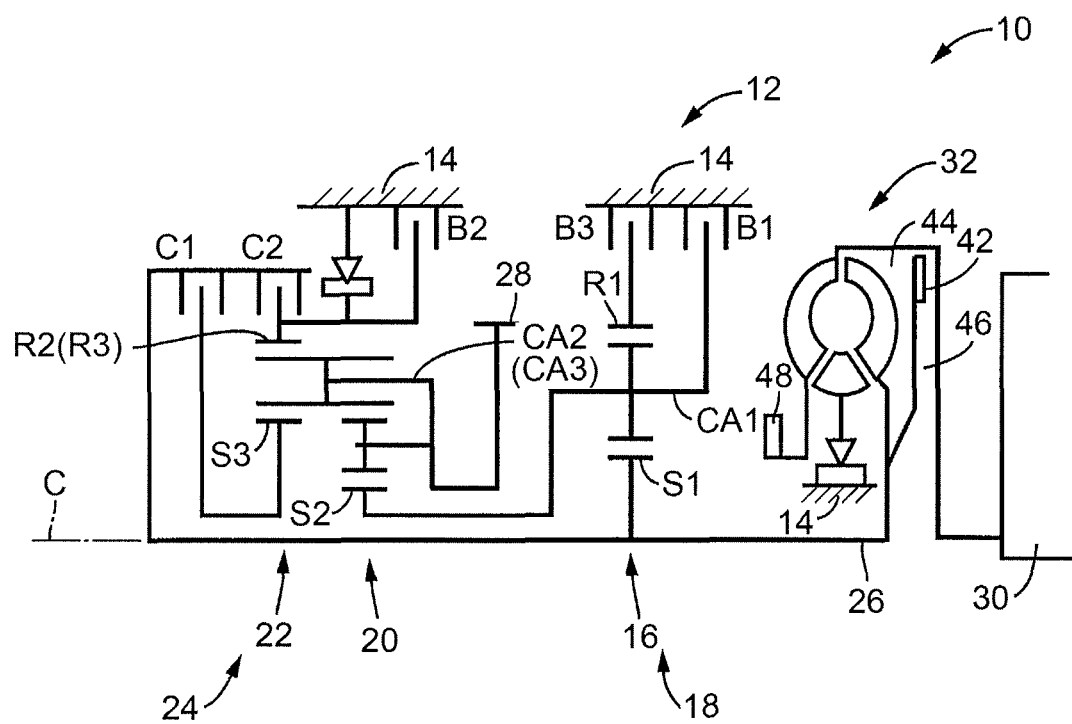
FIG. 1 is a skeletal view for explaining a configuration of an automatic transmission provided in a vehicle to which the invention is applied.

FIG. 1 is a skeletal view for explaining a schematic configuration of an automatic transmission 12 provided in a vehicle 10 to which the invention is applied. FIG. 2 is an operation table for explaining operation states of friction engagement elements at a time that any of plural gear stages GS (transmission gear stages GS) of the automatic transmission 12 is established. In FIG. 1, this automatic transmission 12 is preferably used for an FF vehicle, and is mounted in a right-left direction of the vehicle 10 (laterally). The automatic transmission 12 has a first gear change section 18 and a second gear change section 24 on a common axis C in a transaxle case 14 (hereinafter, a case 14) as a non-rotational member attached to a vehicle body, changes a speed of rotation of an input shaft 26 and outputs the rotation from an output gear 28. The first gear change section 18 is configured by including a first planetary gear device 16 of a single pinion type as a main body, and the second gear change section 24 is configured as a Ravigneaux type by including a second planetary gear device 20 of a double pinion type and a third planetary gear device 22 of a single pinion type as main bodies. The input shaft 26 corresponds to an input rotational member of the automatic transmission 12, and is integrally configured with a turbine shaft of a torque converter 32 as a fluid type transmission device that is rotationally driven by an engine 30 as a traveling drive power source in this embodiment. In addition, in this embodiment, the output gear 28 corresponds to an output rotational member of the automatic transmission 12 and functions as a counter drive gear that constitutes a counter gear pair by meshing with a counter driven gear so as to transmit the power to a differential gear device 34 shown in FIG. 4, for example. The counter driven gear is coaxially arranged with a differential drive pinion that constitutes a final gear pair by meshing with a differential ring gear 36. In the automatic transmission 12 that is configured just as described and the like, output of the engine 30 is sequentially transmitted to right and left drive wheels 40 via a power transmission device 11 for the vehicle that includes the torque converter 32, the automatic transmission 12, the differential gear device 34, a pair of axles 38, and the like (see FIG. 4). It should be noted that the automatic transmission 12 and the torque converter 32 are configured in a substantially symmetrical manner with respect to a center line (the axis) C, and a lower half portion thereof from the axis C is not shown in the skeletal view in FIG. 1.

The torque converter 32 includes a lockup clutch 42 as a lockup mechanism that directly transmits the power of the engine 30 to the input shaft 26 without interposing a fluid. This lockup clutch 42 is a hydraulic friction clutch that is frictionally engaged by differential pressure $\Delta P$ between hydraulic pressure in an engagement side oil chamber 44 and hydraulic pressure in a disengagement side oil chamber 46, and by complete engagement (lockup-on) thereof, the power of the engine 30 is directly transmitted to the input shaft 26. In addition, the differential pressure $\Delta P$, that is, torque transmission capacity is subjected to feedback control such that the lockup clutch 42 is engaged in a specified slipping state, for example. In this way, while the turbine shaft (the input shaft 26) is rotated by following the output rotational member of the engine 30 in a specified slipping amount of approximately 50 rpm, for example, at a time that the vehicle is driven (power-on), the output rotational member of the engine 30 is rotated by following the turbine shaft in a specified slipping amount of approximately −50 rpm, for example, at a time that the vehicle is not driven (power-off).

In accordance with a combination of any of coupling states of the rotation elements (sun gears S1 to S3, carriers CA1 to CA3, ring gears R1 to R3) of the first gear change section 18 and the second gear change section 24, the automatic transmission 12 establishes six forward gear stages (forward transmission gear stages) from a first gear stage "1st" to a sixth gear stage "6th" and also establishes a reverse gear stage (reverse transmission gear stage) of a reverse gear stage "R". As shown in FIG. 2, for example, regarding the forward gear stages, the first gear stage, the second gear stage, the third gear stage, the fourth gear stage, the fifth gear stage, and the sixth gear stage are respectively established by engagement between a clutch C1 and a brake B2, engagement between the clutch C1 and a brake B1, engagement between the clutch C1 and a brake B3, engagement between the clutch C1 and a clutch C2, engagement between the clutch C2 and the brake B3, and engagement between the clutch C2 and the brake B1. In addition, it is configured that the reverse gear stage is established by engagement between the brake B2 and the brake B3, and that disengagement of all of the clutches C1, C2 and the brakes B1 to B3 leads to a neutral state. It should be noted that a mechanical oil pump 48 for generating operating hydraulic pressure when being rotationally driven by the engine 30 is provided in the case 14, and the operating hydraulic pressure is source pressure for operating the above clutches C1, C2 and brakes B1 to B3.

The operation table in FIG. 2 summarizes relationships between each of the above gear stages GS and operational states of the clutches C1 to C2, the brakes B1 to B3, and F1, a "circle" indicates the engagement, and a "double circle" indicates the engagement only during engine braking. It should be noted that, since the one-way clutch F1 is provided in parallel in the brake B2 for establishing the first gear stage "1st", the brake B2 does not always have to be engaged at a start (during acceleration). Accordingly, this clutch C1 functions as a starting clutch. In addition, a transmission gear ratio γGS (=a rotational speed NIN of the input shaft 26/a rotational speed NOUT of the output gear 28) of each of the gear stages GS is appropriately defined by each gear ratio (=the number of teeth of the sun gear/the number of teeth of the ring gear) ρ1, ρ2, ρ3 of the first planetary gear device 16, the second planetary gear device 20, and the third planetary gear device 22.

The above clutches C1, C2 and brakes B1 to B3 (hereinafter, simply referred to as a clutch C, a brake B unless otherwise specifically distinguished) are a hydraulic friction engagement device that is engaged and controlled by a hydraulic actuator, such as a multiplate clutch or brake, and that transmits the power of the engine 30 to the drive wheel 40 side when being engaged. The engaged state and the disengaged state of each of the clutch C and the brake B are switched, and transient operating hydraulic pressure during the engagement, that during the disengagement, and the like are controlled by excitation, non-excitation, and current control of linear solenoid valves SL1 to SL5 (see FIGS. 4, 5) in a hydraulic pressure control circuit 100. In addition, accumulation of the hydraulic pressure to an accumulator ACM and supply of the hydraulic pressure from the accumulator ACM to each of the hydraulic friction engagement devices are switched by excitation, non-excitation, and current control of an on/off solenoid valve SV1.

Figure 3:
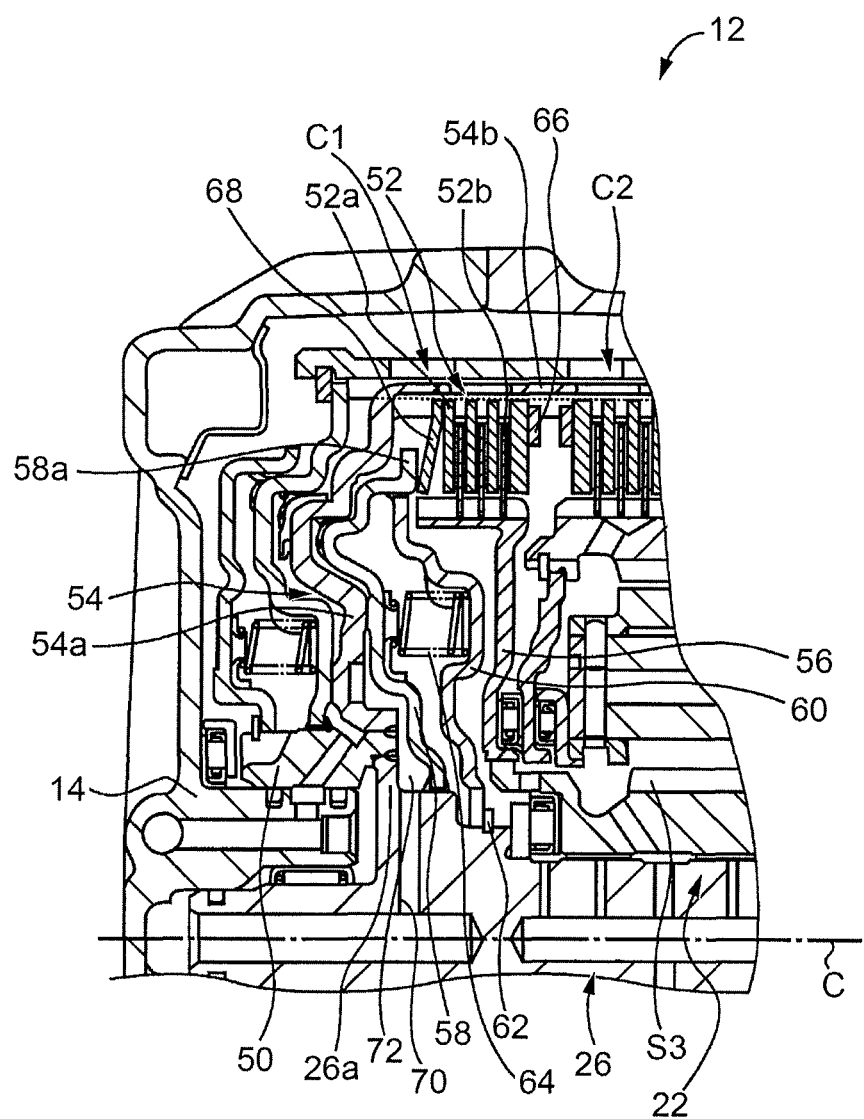
FIG. 3 is a cross-sectional view of a main part that shows a part of the automatic transmission including a clutch C1.

FIG. 3 is a cross-sectional view of a main part that shows a part of the automatic transmission 12 including the clutch C1. It should be noted that the hydraulic friction engagement device will be described herein by exemplifying the clutch C1; however, the clutch C2 basically has a similar configuration. In addition, similar to FIG. 1, the lower half portion thereof from the axis C is not shown in the cross-sectional view in FIG. 3.

As shown in FIG. 3, the input shaft 26 is supported by the case 14 via a bearing in a manner capable of making a relative rotation therewith, and is provided with a flange 26a that extends perpendicularly to the axis C. On an outer circumferential edge of the flange 26a of the input shaft 26, an annular base member 50 that is integrally welded and joined to the outer circumferential edge thereof and is supported in a manner capable of making a relative rotation with the case 14 is provided. A clutch drum 54 that supports a friction engagement element 52 as a component of the clutch C1 is integrally welded and joined to an outer circumferential surface of this base member 50, and rotates integrally with the input shaft 26.

The clutch drum 54 is a cylindrical bottomed member that is opened to one side in an axial direction, and is configured by including: a bottom plate 54a in a substantially annular plate shape (a disc shape), an inner circumferential of which is welded and joined to the outer circumferential surface of the base member 50; and a cylindrical section 54b in a cylinder shape that is coupled to an outer circumferential surface of the bottom plate 54a and extends in parallel with the axis. Spline teeth that extend longitudinally are provided in an inner circumferential surface of the cylindrical section 54b of the clutch drum 54, and outer circumferential edges of plural separate plates 52a of the friction engagement element 52 that constitutes the clutch C1 are spline-fitted thereto.

The friction engagement element 52 is configured by including: the plural separate plates 52a in substantially annular plate shapes (disc shapes), the outer circumferential edges of which are spline-fitted to the inner circumferential surface of the cylindrical section 54b; and plural friction plates 52b in substantially annular plate shapes (disc shapes), each of which interposed between the plural separate plates 52a, and inner circumferential edges of which are spline-fitted to an outer circumferential surface of a clutch hub 56. This clutch hub 56 is coupled to the sun gear S3 of the third planetary gear device 22 and transmits the rotation thereof.

A piston 58 and a spring retaining plate 60 for pressing the friction engagement element 52 from the clutch drum 54 side are arranged between the clutch drum 54 and the clutch hub 56. An inner circumferential surface of the piston 58 is fitted to the input shaft 26 via a seal in a slidable manner in the axial direction, and an outer circumferential edge thereof is provided with a pressing section 58a that extends in a direction of the friction engagement element 52. The spring retaining plate 60 is inhibited from moving to one side in the axial direction by abutting against a snap ring 62 that is fitted and attached to the input shaft 26, and is also inhibited from moving to the other side in the axial direction of the spring retaining plate 60 by a return spring 64 that is interposed between the piston 58 and the spring retaining plate 60 and urges the piston 58 to abut against the bottom plate 54a of the clutch drum 54.

Furthermore, in the clutch C1, a snap ring 66 for inhibiting movement of the each friction plate of the separate plates 52a and the friction plates 52b in the axial direction is fitted and attached to the inner circumferential surface of the cylindrical section 54b. In addition, a cushion plate 68 is interposed between the separate plates 52a and the pressing section 58a of the piston 58 that are on an opposite side of the snap ring 66 in the friction engagement element 52. The cushion plate 68 is a ring-shaped spring member, an outer circumferential edge of which is spline-fitted to the spline teeth of the cylindrical section 54b, and that extends on a radially inner side for a substantially equal length to the separate plates 52a. As will be described below, this cushion plate 68 is configured to be incapable of controlling the hydraulic pressure during the disengagement of the clutch C1 but disengage the clutch C1 simply by draining (discharging) operating oil, for example. Accordingly, the cushion plate 68 is provided for a purpose of reducing a shock during the disengagement of the clutch C1.

In the clutch C1 that is configured just as described, when the operating oil is supplied to an oil chamber 72 from an operating oil passage 70 provided in the input shaft 26, the piston 58 acts against an urging force of the return spring 64 and moves in the direction of the friction engagement element 52 by the hydraulic pressure of the operating oil. In this way, the pressing section 58a presses the cushion plate 68. By this pressing, the separate plate 52a that is adjacent to the cushion plate 68 is pressed to the snap ring 66 side. Accordingly, the separate plates 52a and the friction plates 52b are pressed to the snap ring 66 side. Since the movement of the separate plates 52a and the friction plates 52b in the axial direction is inhibited by the snap ring 66, the friction engagement element 52 is engaged, that is, the clutch C1 is engaged. It should be noted that the oil chamber 72 and the piston 58 function as the hydraulic actuators of the clutch C1 that are operated by an action of the operating oil.

Figure 4:
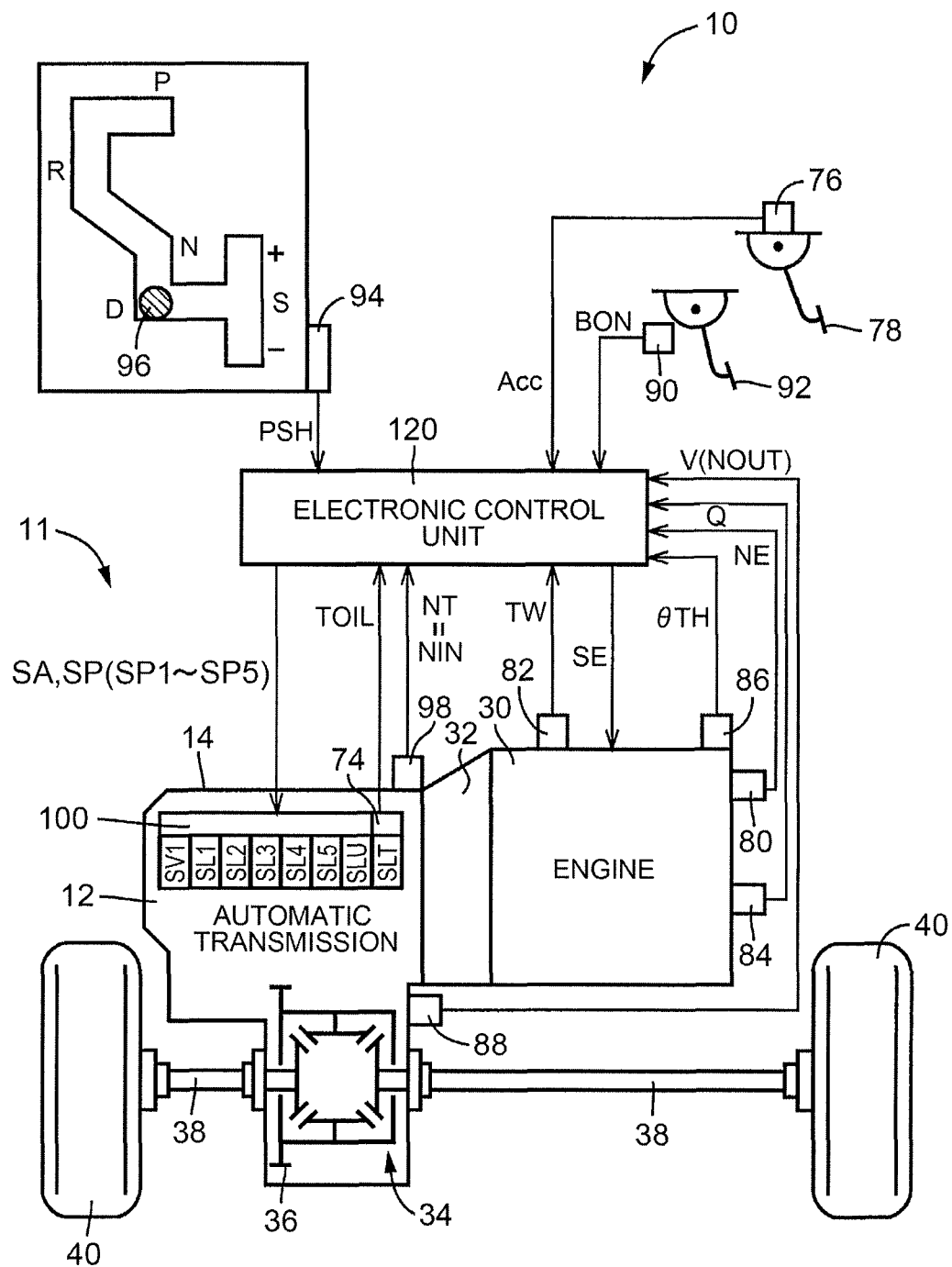

FIG. 4 is a block diagram for explaining a main part of an electric control system that is provided in the vehicle 10 for controlling the engine 30, the automatic transmission 12, and the like. In FIG. 4, the vehicle 10 includes an electronic control unit 120 that includes a hydraulic pressure control device related to economic running control of the automatic transmission 12 and the like, for example. This electronic control unit 120 is configured by including a so-called microcomputer that includes a CPU, a RAM, a ROM, an input/output interface, and the like, for example. The CPU executes output control of the engine 30, gear change control of the automatic transmission 12, and the like by performing a signal process in accordance with a program stored in the ROM in advance while using a temporary storage function of the RAM, and is configured to be divided into an engine control device for controlling the engine, the hydraulic pressure control device for controlling the gear change that controls the linear solenoid valves SL1 to SL5 and the on/off solenoid valve SV1 in the hydraulic pressure control circuit 100, and the like upon necessary.

The electronic control unit 120 is supplied with, for example, a signal indicative of an operating oil temperature TOIL (° C.) that is a temperature of the operating oil (for example, a known ATF) in the hydraulic pressure control circuit 100 detected by an operating oil temperature sensor 74, a signal indicative of an accelerator operation amount Acc (%) that is an operation amount of an accelerator pedal 78 as an amount requested by a driver to the vehicle 10 (a driver request amount) detected by an accelerator operation amount sensor 76, a signal indicative of an engine speed NE (rpm) as a speed of the engine 30 detected by an engine speed sensor 80, a signal indicative of a coolant temperature TW (° C.) of the engine 30 detected by a coolant temperature sensor 82, a signal indicative of an intake air amount Q (Q/N) of the engine 30 detected by an intake air amount sensor 84, a signal indicative of a throttle valve opening degree θTH (%) as an opening degree of an electronic throttle valve detected by a throttle valve opening degree sensor 86, a signal indicative of an output rotational speed NOUT (rpm) as a rotational speed of the output gear 28 that corresponds to a vehicle speed V (km/h) detected by a vehicle speed sensor 88, a signal indicative of an operation (on) BON of a foot brake pedal 92 that indicates a foot brake as a normal brake is currently operated (currently depressed) and that is detected by a brake switch 90, a signal indicative of a lever position (an operated position, a shift position) PSH of a shift lever 96 detected by a lever position sensor 94, a signal indicative of a turbine rotational speed NT (rpm) as a rotational speed of a turbine of the torque converter 32 detected by a turbine rotational speed sensor 98 (that is, the input rotational speed NIN as a rotational speed of the input shaft 26), and the like.

Meanwhile, the electronic control unit 120 outputs an engine output control command signal SE for the output control of the engine 30, a drive signal transmitted to a throttle actuator so as to control opening/closing of the electronic throttle valve in accordance with the accelerator operation amount Acc, for example, an injection signal for controlling a fuel injection amount injected from a fuel injector, an ignition timing signal for controlling ignition timing of the engine 30 by an igniter, and the like. In addition, the electronic control unit 120 outputs a hydraulic pressure control command signal SP for the gear change control of the automatic transmission 12, a valve command signal (a hydraulic pressure command value, a drive signal) for controlling the excitation, non-excitation, and the like of the linear solenoid valves SL1 to SL5 and the on/off solenoid valve SV1 in the hydraulic pressure control circuit 100 for switching the gear stages GS of the automatic transmission 12, for example, a drive signal for controlling adjustment of line hydraulic pressure PL, and the like.

In addition, the shift lever 96 is disposed in the vicinity of a driver seat, for example, and, as shown in FIG. 4, is manually operated to five lever positions, "P", "R", "N", "D", or "S".

The "P" position (range) is a parking position (location) at which a power transmission passage in the automatic transmission 12 is released, that is, the vehicle is brought into a neutral state in which the power transmission in the automatic transmission 12 is blocked and in which the rotation of the output gear 28 is mechanically inhibited (locked) by a mechanical parking mechanism. The "R" position is a reverse travel position (location) to reverse a rotational direction of the output gear 28 of the automatic transmission 12. The "N" position is a neutral position (location) at which the vehicle is brought into the neutral state in which the power transmission in the automatic transmission 12 is blocked. In addition, the "D" position is a forward travel position (location) at which automatic gear change control is executed by using all of the forward gear stages from the first gear stage "1st" to the sixth gear stage "6th" in a transmission gear range (a D range) in which the gear change of the automatic transmission 12 is allowed. The "S" position is a forward travel position (location) at which a manual gear change can be made by switching among plural types of transmission gear ranges, each of which limits a change range of the gear stages, that is, plural types of the transmission gear ranges in which the gear stages on the high vehicle speed side differ.

Figure 5:
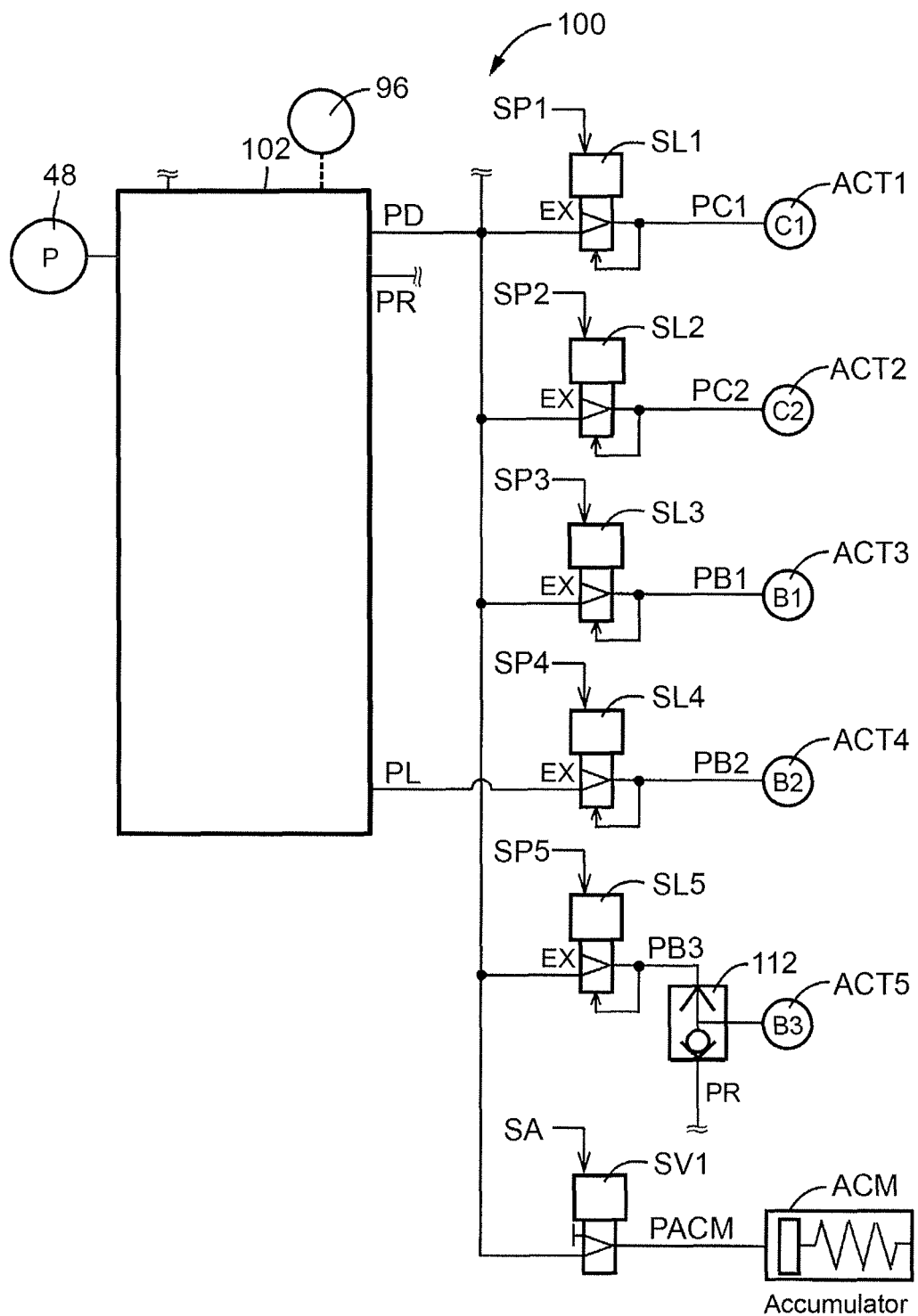
FIG. 5 is a circuit diagram related to linear solenoid valves for respectively controlling operations of hydraulic actuators of clutches and brakes in a hydraulic pressure control circuit in FIG. 4.

FIG. 5 is a view of a main part of the hydraulic pressure control circuit related to the linear solenoid valves SL1 to SL5 for respectively controlling the operations of hydraulic actuators (hydraulic cylinders) ACT1 to ACT5 of the clutches C1, C2 and the brakes B1 to B3 in the hydraulic pressure control circuit 100 and the on/off solenoid valve SV1 for controlling the operation of the accumulator ACM.

In FIG. 5, a hydraulic pressure supply device 102 includes: a regulator valve for adjusting the line hydraulic pressure with the hydraulic pressure generated from the mechanical oil pump 48 (see FIG. 1), which is rotationally driven by the engine 30, as the source pressure; a manual valve 110 for mechanically or electrically switching the oil passage on the basis of an operation of the shift lever 96; and the like. This manual valve 110 outputs the line hydraulic pressure PL (Pa) that enters the manual valve 110 as drive hydraulic pressure PD (Pa) when the shift lever 96 is operated to the "D" position or the "S" position, for example, outputs the line hydraulic pressure PL (Pa) that enters the manual valve 110 as reverse hydraulic pressure PR (Pa) when the shift lever 96 is operated to the "R" position, and blocks output of the hydraulic pressure (guides the drive hydraulic pressure PD and the reverse hydraulic pressure PR to a discharge side) when the shift lever 96 is operated to the "P" position or the "N" position. Just as described, the hydraulic pressure supply device 102 outputs the line hydraulic pressure PL, the drive hydraulic pressure PD, and the reverse hydraulic pressure PR.

In addition, the hydraulic pressure control circuit 100 is provided with the linear solenoid valves SL1 to SL5 (hereinafter described as a linear solenoid valve SL unless otherwise specifically distinguished) and the on/off solenoid valve SV1 that respectively correspond to the hydraulic actuator ACT1 to ACT5 and the accumulator ACM. The drive hydraulic pressure PD supplied from the hydraulic pressure supply device 102 is adjusted to the operating hydraulic pressure PC1, PC2, PB1, PB3, PACM (Pa) that correspond to the command signal from the electronic control unit 120, and is directly supplied to the hydraulic actuators ACT1, ACT2, ACT3, ACT5 and the accumulator ACM by the linear solenoid valves SL1, SL2, SL3, SL5 and the on/off solenoid valve SV1 respectively corresponding thereto. In addition, the line hydraulic pressure PL that is supplied from the hydraulic pressure supply device 102 is adjusted to the operating hydraulic pressure PB2 that corresponds to the command signal from the electronic control unit 120, and is directly supplied to the hydraulic actuator ACT4 by the linear solenoid valve SL4 corresponding thereto. It should be noted that either the operating hydraulic pressure PB3 adjusted by the linear solenoid valve SL5 or the reverse hydraulic pressure PR is supplied to the hydraulic actuator ACT5 of the brake B3 via a shuttle valve 112.

The linear solenoid valves SL1 to SL5 basically have the same configuration, the on/off solenoid valve SV1 is a solenoid valve that is driven to be on or off. The linear solenoid valves SL1 to SL5 and the on/off solenoid valve SV1 are excited, unexcited, or subjected to the current control independently from each other by the electronic control unit 120, independently execute adjustment control of the hydraulic pressure supplied to the hydraulic actuators ACT1 to ACT5 and the accumulator ACM, and control the operating hydraulic pressure PC1, PC2, PB1, PB2, PB3, PACM of the clutches C1, C2, the brakes B1 to B3, and the accumulator ACM. In the automatic transmission 12, each of the gear stages GS is established by the engagement of the predetermined friction engagement elements as shown in the operation table in FIG. 2, for example. In addition, in the gear change control of the automatic transmission 12, a so-called clutch-to-clutch gear change is performed by engagement shifting of the disengagement-side friction engagement element and the engagement-side friction engagement element of the clutch C and the brake B that are involved in the gear change, for example. During this clutch-to-clutch gear change, disengagement transition hydraulic pressure of the disengagement-side friction engagement element and engagement transition hydraulic pressure of the engagement-side friction engagement element are appropriately controlled such that the gear change shock is suppressed and the gear change is performed as soon as possible. For example, as shown in the engagement operation table in FIG. 2, in an upshift from the third gear to the fourth gear, the brake B3 is disengaged, the clutch C2 is engaged, and the disengagement transition hydraulic pressure of the brake B3 and the engagement transition hydraulic pressure of the clutch C2 are appropriately controlled to suppress the gear change shock.

Figure 6:
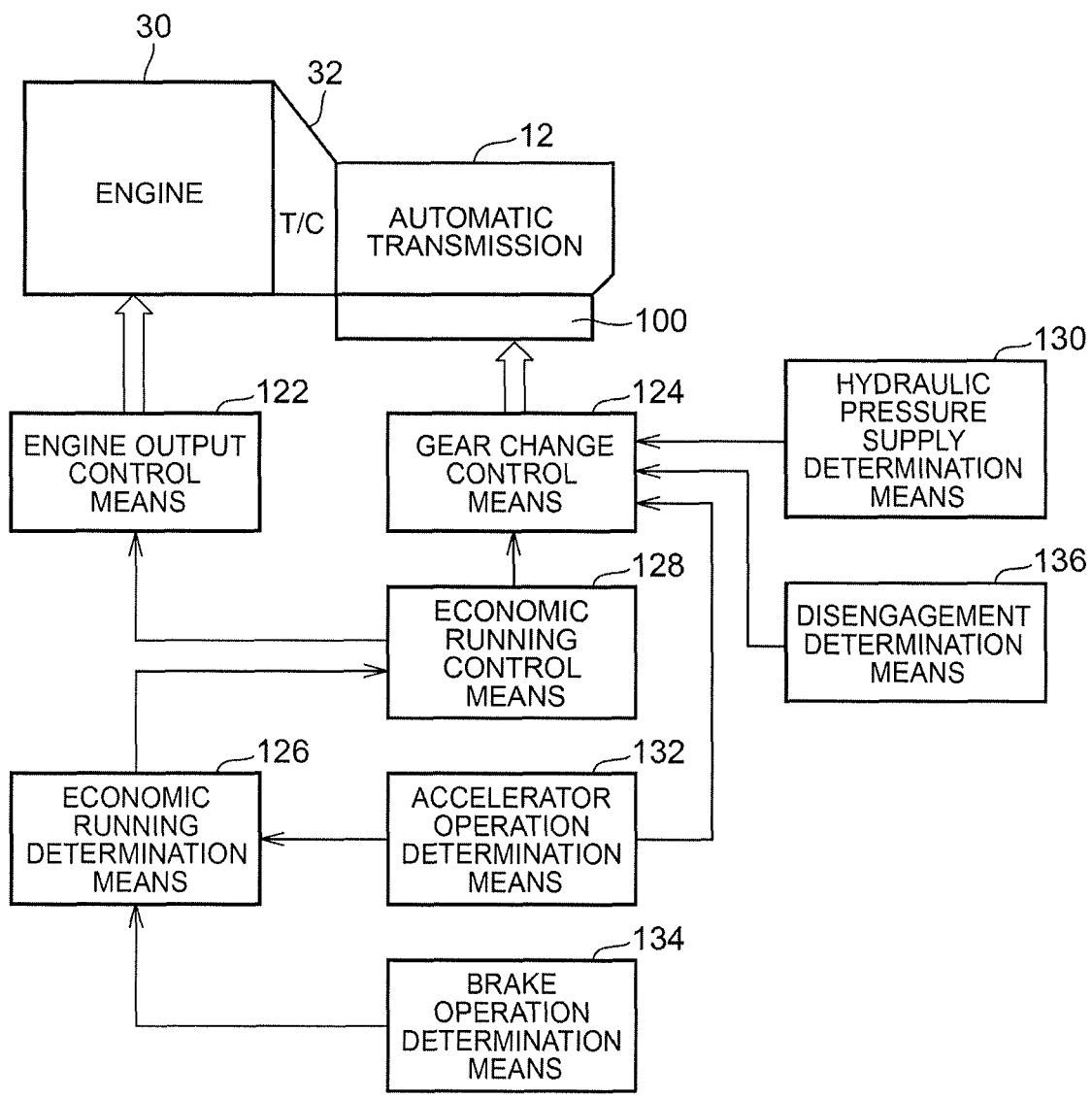
FIG. 6 is a functional block diagram for explaining a main part of a control function of an electronic control unit in FIG. 4.

FIG. 6 is a functional block diagram for explaining a main part of a control function by the electronic control unit 120. In FIG. 6, in addition to the execution of opening/closing control of the electronic throttle valve by using the throttle actuator for throttle control, for example, engine output control means 122 controls the fuel injection amount by the fuel injector for fuel injection amount control and outputs the engine output control command signal SE for controlling an ignition device such as the igniter for ignition timing control. For example, in addition to the execution of the opening/closing control of the electronic throttle valve to achieve the throttle valve opening degree θTH, at which target engine torque is obtained, based on the actual engine speed NE from a relationship (an engine torque map) between the engine speed NE and an estimated value of engine torque TE (hereinafter estimated engine torque) TE' that uses the throttle valve opening degree θTH as a parameter and that is obtained and stored in advance from an experiment, the engine output control means 122 controls the fuel injection amount by the fuel injector and controls the ignition device such as the igniter.

Gear change control means 124 makes a gear change determination on the basis of the actual vehicle speed V and the actual accelerator operation amount Acc from a relationship (a gear change map, a gear change graph) that uses the vehicle speed V and the accelerator operation amount Acc as variables and that is stored in advance, for example, and determines whether the gear change of the automatic transmission 12 should be performed. Then, the gear change control means 124 determines the gear stage GS to be changed in the automatic transmission 12, and outputs a gear change command for executing the automatic gear change control of the automatic transmission 12 to achieve the determined gear stage GS. For example, the gear change control means 124 outputs the hydraulic pressure control command signal (a gear change output command value) SP, which is used to engage and/or disengage the hydraulic friction engagement device involved in the gear change of the automatic transmission 12, to the hydraulic pressure control circuit 100 such that the gear stage GS is established in accordance with the operation table shown in FIG. 2.

Through the hydraulic pressure control command signal SP, a torque command value for controlling the torque transmission capacity (clutch torque) of the clutch C or the brake B, that is, a hydraulic pressure command value for generating the operating hydraulic pressure, at which the required torque transmission capacity is obtained, is output. The hydraulic pressure command value is also a torque command value of the disengagement-side friction engagement element, for example, at which the operating hydraulic pressure is discharged so as to obtain the required torque transmission capacity for disengaging the disengagement-side friction engagement element. In addition, a hydraulic pressure command value that is a torque command value of the engagement-side friction engagement element and at which the operating hydraulic pressure is supplied so as to obtain the required torque transmission capacity for engaging the engagement-side friction engagement element is output. Furthermore, at a time that the gear is not changed to maintain any of the gear stages GS of the automatic transmission 12, the hydraulic pressure command value for generating the operating hydraulic pressure, at which a friction force that can endure transmission input torque TIN can be retained (that is, the torque transmission capacity can be secured), is output.

The hydraulic pressure control circuit 100 operates the linear solenoid valves SL1 to SL5 and the on/off solenoid valve SV1 in the hydraulic pressure control circuit 100 such that the gear change of the automatic transmission 12 is performed or the current gear stage GS of the automatic transmission 12 is maintained in accordance with the hydraulic pressure control command signal SP from the gear change control means 124, and operates each of the hydraulic actuators ACT1 to ACT5 and the accumulator ACM of the friction engagement element that is involved in the establishment (setting) of the gear stage GS.

Here, in the vehicle 10 of this embodiment, in order to reduce fuel consumption during a travel of the vehicle, for example, the so-called economic running control for temporarily stopping the operation of the engine 30 is executed. This economic running control is control in which, the engine output control command signal SE is output from the engine output control means 122 so as to stop the engine 30 when a specified economic running start condition, which is set in advance, is satisfied, for example, and in which the friction engagement element, which is brought into the engaged state to establish the transmission gear stage immediately before the start of the economic running control in the engaged state, is brought into the disengaged state, so as to bring the power transmission passage in the automatic transmission 12 into a power transmission suppression state.

More specifically, economic running determination means 126 determines whether the specified economic running start condition is established when the shift lever 96 is in the travel position, for example. The establishment of this specified economic running start condition is a case where, for example, when a lever position PSH is the "D" position, the vehicle speed V is lower than a specified vehicle speed determination value V0 to determine whether the transmission gear stage for starting the economic running is selected, the accelerator operation amount Acc is a specified operation amount zero determination value for determining that an accelerator is off, and the signal indicative of the operation (on) BON is output from the brake switch 90.

In addition, the economic running determination means 126 sequentially determines whether to cancel (terminate) the economic running control by determining whether a specified economic running cancellation condition is established during the economic running control by economic running control means 128, which will be described below. The establishment of this specified economic running cancellation condition is a case where, for example, the accelerator operation amount becomes at least equal to a specified accelerator operation amount determination value at which a depressing operation of the accelerator pedal 78 is determined to be made and where the signal indicative of the operation (on) BON stops being output from the brake switch 90 during the economic running by the economic running control means 128.

For example, in the case where the economic running determination means 126 determines that the economic running start condition is established in a state where the fourth gear stage is formed, the economic running control means 128 outputs an economic running control start command to the gear change control means 124. By the economic running control start command, the engine control device outputs the engine output control command signal SE for stopping the engine 30 from the engine output control means 122, and the clutches C1 and C2 as the friction engagement elements for establishing the fourth gear stage are brought into the disengaged states. The gear change control means 124 shifts the hydraulic pressure control command signal SP to the hydraulic pressure control circuit 100 in accordance with the economic running control start command. First, in order to bring the clutch C2 into the disengaged state, a hydraulic pressure control command signal SP2 is shifted to the disengagement side such that engagement pressure of the clutch C2 is reduced in accordance with a predetermined specified disengagement pattern. Thereafter, a hydraulic pressure control command signal SP1 is shifted to the disengagement side such that engagement pressure of the clutch C1 is reduced.

For example, in the case where the transmission gear stage immediately before the start of the economic running is the fourth gear, the gear change control means 124 shifts the hydraulic pressure control command signal SP2 transmitted to the clutch C2 to the disengagement side. Here, of the friction engagement elements for establishing the fourth gear, the clutch C1 is the friction engagement element that is common among the friction engagement elements for establishing the transmission gear stages of the fourth gear and below. Then, after an accumulated pressure supply command signal SA, which is used to supply the hydraulic pressure accumulated in the accumulator ACM to the clutch C1, is output to the on/off solenoid valve SV1, the hydraulic pressure control command signal SP1 transmitted to the clutch C1, which is common among the friction engagement elements for establishing the transmission gear stages of the fourth gear and below, is shifted to the disengagement side.

Just as described, after the hydraulic pressure control command signal SP2 is shifted to the disengagement side so as to reduce the operating hydraulic pressure PC2 of the clutch C2, the accumulated pressure supply command signal, which is used to supply the hydraulic pressure accumulated in the accumulator ACM to the clutch C1, is output. Thereafter, the hydraulic pressure control command signal SP1 is shifted to the disengagement side so as to reduce the operating hydraulic pressure PC1 of the clutch C1. In this way, release of the hydraulic pressure from the clutch C1 can be delayed. Thus, a possibility that the economic running cancellation condition is established in a state where the hydraulic pressure remains in the clutch C1, which is common among the friction engagement elements for establishing any of the gear stages GS immediately after the cancellation of the economic running can be increased. In the case where the economic running cancellation condition is established in a state where the hydraulic pressure remains in the clutch C1, the hydraulic pressure can promptly be supplied to the friction engagement elements for establishing the transmission gear stage immediately after the cancellation of the economic running due to the remaining hydraulic pressure in the clutch C1. Thus, the desired transmission gear stage can promptly be set.

For example, in the case where the gear stage GS immediately before the start of the economic running is the fourth gear stage and where the gear stage GS immediately after the cancellation of the economic running is the third gear stage, the economic running control means 128 makes the engine control device output the engine output control command signal SE for starting the engine 30 from the engine output control means 122, outputs the economic running cancellation command to the gear change control means 124, and cancels (terminates) the economic running control when it is determined by the economic running determination means 126 that the economic running control cancellation condition is established during the economic running control.

Through the economic running cancellation command, the torque transmission capacity of the clutch C1 and the brake B3, which are the engagement-side friction engagement elements of the third gear stage as the gear stage GS immediately after the cancellation of the economic running, is increased, and the clutch C1 and the brake B3 are engaged. That is, the economic running control is cancelled. In accordance with the economic running cancellation command, the gear change control means 124 first shifts the hydraulic pressure control command signal SP1 to the engagement side so as to increase the operating hydraulic pressure PC1 of the clutch C1 in accordance with the predetermined specified engagement pattern and bring the clutch C1 into the engaged state. Thereafter, the gear change control means 124 shifts a hydraulic pressure control command signal SP3 to the engagement side so as to increase the operating hydraulic pressure PB3 of the brake B3 in accordance with the predetermined specified engagement pattern and bring the brake B3 into the engaged state.

Here, the above specified engagement pattern at the time that the economic running control is cancelled (during the cancellation of the economic running), that is, the hydraulic pressure command value of the clutch C1 will be considered. For example, the economic running control is cancelled when the accelerator is on. However, when the engine speed NE still remains to be lower than a specified speed Ne0, the engine speed NE is low, and the supply of the hydraulic pressure by the oil pump 48 is insufficient. Accordingly, even when the prompt engagement of the clutch C1 is attempted, the clutch C1 cannot possibly be engaged. Thus, as shown in FIG. 7, as the specified engagement pattern during the cancellation of the economic running, the clutch C1 is engaged after the engine speed NE is increased to be at least equal to the specified speed Ne0.

Figure 7:
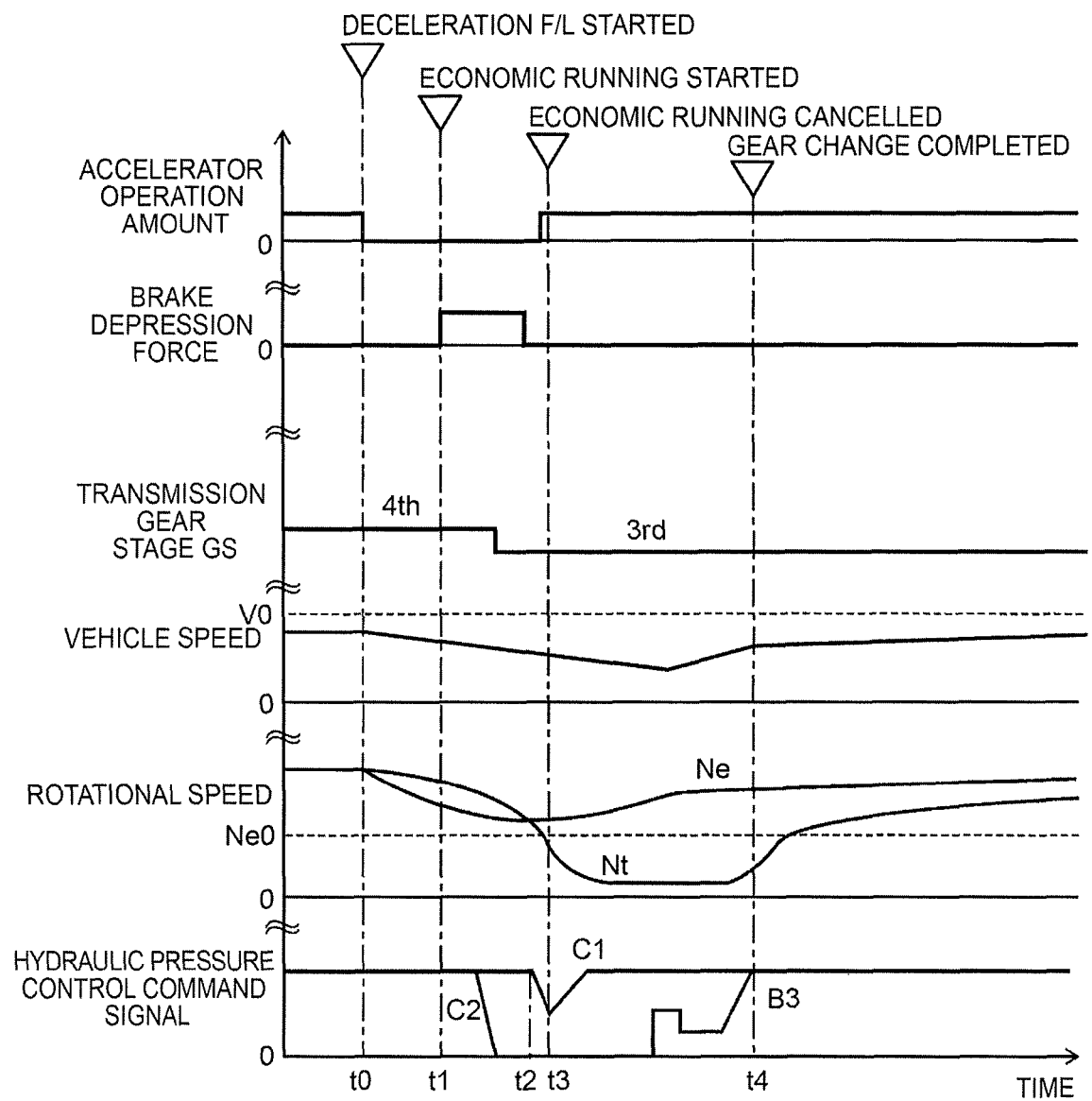
FIG. 7 is a time chart that corresponds to a control operation of the electronic control unit in FIG. 4, and is a chart of one example of a control operation of the friction engagement element in this embodiment.

In FIG. 7, after the accelerator operation amount Acc is returned to zero and a coasting travel of the vehicle (deceleration F/L) is started (a time point t0), it is determined that the economic running start condition, which is associated with the accelerator off and the brake on, is established (a time point t1). Next, due to the establishment of the economic running start condition, first, the hydraulic pressure control command signal SP2 to the linear solenoid valve SL2 of the clutch C2 starts being shifted to the disengagement side. At a time point t2, the hydraulic pressure control command signal SP1 to the linear solenoid valve SL1 of the clutch C1 starts being shifted to the disengagement side in conjunction with a reduction in the engine speed. Then, the brake is turned off and the accelerator is turned on before the clutch C1 has a disengagement steady-state value, and it is thus determined that the economic running cancellation condition is established (a time point t3). Next, due to the establishment of the economic running cancellation condition, first, the hydraulic pressure control command signal SP1 to the linear solenoid valve SL1 of the clutch C1 is shifted to the engagement side, and thereafter, the hydraulic pressure control command signal SP2 to the linear solenoid valve SL2 of the clutch C2 is shifted to the engagement side (a time point t4).

More specifically, returning to FIG. 6, accelerator operation determination means 132 is accelerator operation-on determination means that determines whether the depressing operation on the accelerator pedal 78 is made, that is, whether the accelerator is turned on, for example, on the basis of whether the accelerator operation amount Acc exceeds the specified operation amount zero determination value that is used to determine the accelerator off when the economic running control is started by the economic running control means 128. In addition, the accelerator operation determination means 132 is also accelerator operation-off determination means that determines whether the depressing operation on the accelerator pedal 78 is not made, that is, whether the accelerator is turned off when the economic running control is cancelled by the economic running control means 128.

Brake operation determination means 134 is brake-on operation determination means 134 that determines whether the signal indicative of the brake operation (on) BON is input, that is, whether the brake is turned on, for example, on the basis of whether the signal indicative of the brake operation (on) BON of the foot brake pedal 92 is input when the economic running control is started by the economic running control means 128. In addition, the brake operation determination means 134 is also brake-off operation determination means 134 that determines whether the signal indicative of the brake operation (on) BON is not input, that is, whether the brake is turned off when the economic running control is cancelled by the economic running control means 128.

Hydraulic pressure supply determination means 130 sequentially determines whether the sufficient hydraulic pressure can be supplied to the friction engagement elements by determining whether a specified hydraulic pressure supply condition is established after the establishment of the economic running cancellation condition. For example, in order to determine whether the specified hydraulic pressure can be supplied to the clutch C1 from the oil pump 48 provided in the torque converter 32, the hydraulic pressure supply determination means 130 determines whether the engine speed NE exceeds the specified speed Ne0. In the case where this hydraulic pressure supply determination is positive and a position of a spool valve provided in the linear solenoid valve SL1 is controlled to a side on which the hydraulic pressure is supplied to the clutch C1, the sufficient hydraulic pressure to engage the clutch C1 can be supplied. It is because there is no chance that the engine speed NE is lower than the specified speed Ne0.

Disengagement determination means 136 determines whether a specified elapsed time Tth has elapsed after the hydraulic pressure control command signal SP to the friction engagement element is shifted to the disengagement side. For example, in the case where the transmission gear stage immediately before the start of the economic running is the fourth gear, the disengagement determination means 136 determines whether the time elapsed since the hydraulic pressure control command signal SP2 to the clutch C2, which is the friction engagement element brought into the engaged state to establish the fourth transmission gear stage, is shifted to the disengagement side, is longer than the specified elapsed time Tth. In this way, whether the clutch C2 is in a completely disengaged state can be determined. In the case where this determination is negative, shifting of the hydraulic pressure control command signal SP1 transmitted to the clutch C1 to the engagement side is suspended until the specified elapsed time Tth, at the end of which the clutch C2 is completely disengaged. Then, the clutch C1 is engaged after the clutch C2 is completely disengaged. Thus, the engagement shock during the engagement of the clutch C1 can be suppressed.

Figure 8:
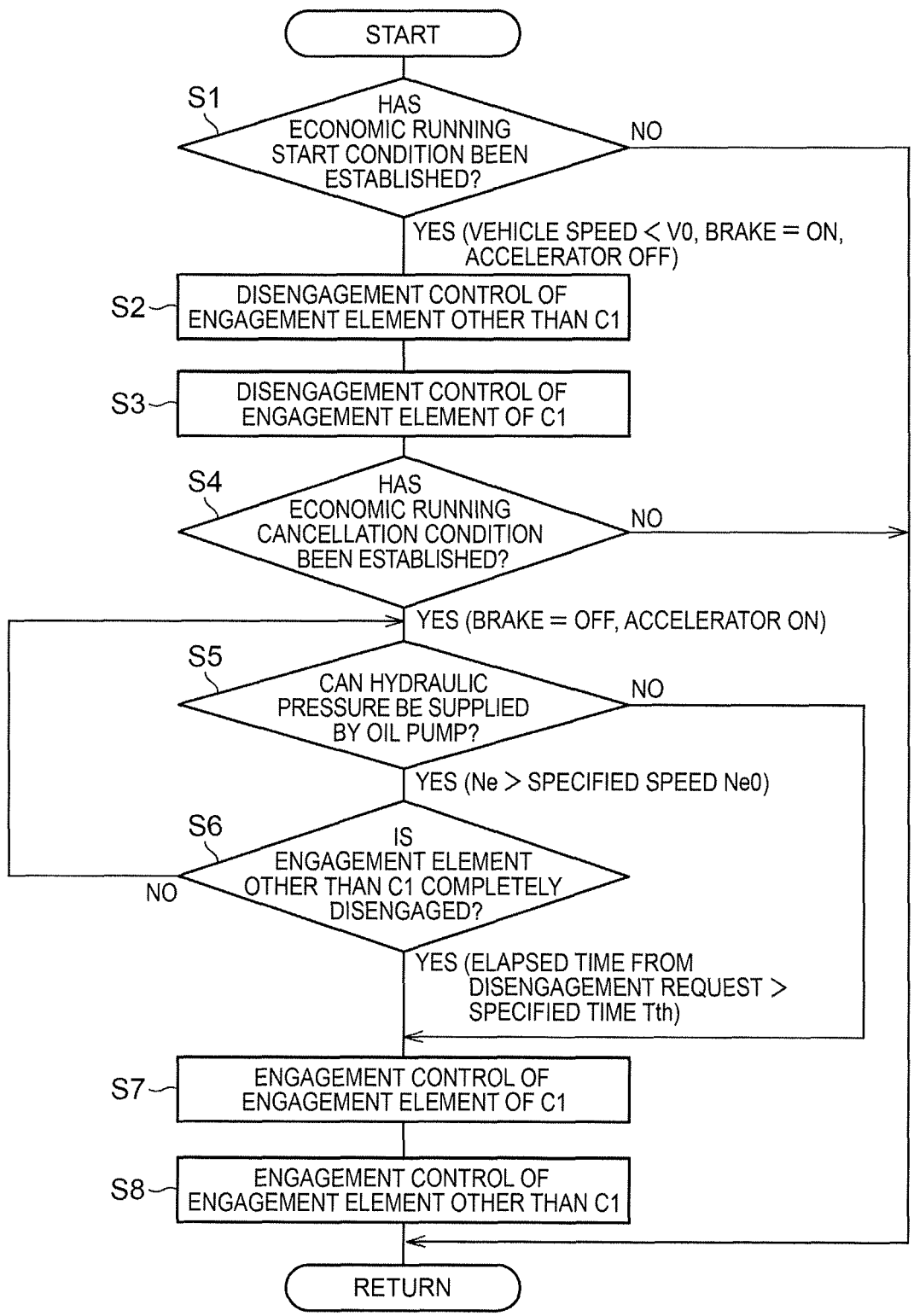
FIG. 8 is a flowchart for explaining a main part of the control operation of the electronic control unit in FIG. 4, that is, the control operation of the friction engagement element during economic running.

FIG. 7 is one example of a time chart in which the control operation shown in the flowchart in FIG. 8 is performed. FIG. 8 is a flowchart for explaining a main part of the control operation of the electronic control unit 120 and is repeatedly performed.

In FIG. 8, first, in step (hereinafter step is abbreviated) S1 that corresponds to the economic running determination means 126, it is sequentially determined whether the economic running control is started by determining whether the specified economic running start condition is established, for example. If the determination of this S1 is negative, this routine is terminated. However, if this determination is positive, for example, the economic running control start command is output and the economic running control is started in S2 that corresponds to the economic running control means 128 (the time point t1 in FIG. 7). Due to the output of this economic running control start command, the engine output control means 122 outputs the engine output control command signal SE for stopping the engine 30 to the engine control device, and the gear change control means 124 shifts the hydraulic pressure control command signal SP2, which is output to the hydraulic pressure control circuit 100 and transmitted to the clutch C2, to the disengagement side, and the gear change control means 124 outputs the accumulated pressure supply command signal, which is used to supply the accumulated pressure in the accumulator ACM to the clutch C1, to the hydraulic pressure control circuit 100. Next, in S3 that corresponds to the gear change control means 124, for example, the gear change control means 124 shifts the hydraulic pressure control command signal SP1, which is output to the hydraulic pressure control circuit 100 and transmitted to the clutch C1, to the disengagement side.

Next, in S4 that corresponds to the economic running determination means 126, it is sequentially determined whether the economic running control is cancelled by determining whether the specified economic running cancellation condition is established, for example. If the determination of this S4 is negative, this routine is terminated. However, if the determination is positive, in S5 that corresponds to the hydraulic pressure supply determination means 130, it is sequentially determined whether the specified hydraulic pressure can be supplied to the clutch C1 from the oil pump 48 by determining whether the engine speed NE exceeds the specified speed Ne0, for example. If the determination of this S5 is negative, a determination of S6 is not made.

If the determination of S5 is positive, in S6 that corresponds to the disengagement determination means 136, it is determined whether the friction engagement element other than the clutch C1 is completely disengaged. For example, by determining whether the elapsed time since the hydraulic pressure control command signal SP2 to the linear solenoid valve SL2 of the clutch C2, which is the friction engagement element other than the clutch C1, is shifted to the disengagement side is longer than the specified time Tth, it is sequentially determined whether the hydraulic pressure control command signal SP2 is the disengagement steady-state value. The disengagement steady-state value is, for example, a minimum value of the hydraulic pressure control command signal SP2.

If the determination of this S6 is negative, this routine is returned to the determination of S5. However, if the determination is positive, in S7 that corresponds to the economic running control means 128, for example, the economic running control start command is output, and the economic running control is cancelled (the time point t3 in FIG. 7). Due to the output of this economic running control cancellation command, the engine output control means 122 outputs the engine output control command signal SE for starting the engine 30 to the engine control device, and the gear change control means 124 shifts the hydraulic pressure control command signal SP1, which is transmitted to the linear solenoid valve SL1 of the clutch C1, to the engagement side. Next, in S8 that corresponds to the gear change control means 124, for example, the gear change control means 124 shifts the hydraulic pressure control command signal SP2, which is transmitted to the linear solenoid valve SL2 of the clutch C2, to the engagement side.

As described above, according to this embodiment, at the start of the economic running control, the hydraulic pressure control command signal SP1 to the clutch C1 is shifted to the disengagement side after the hydraulic pressure control command signal SP2 to the clutch C2. In this way, the release of the hydraulic pressure from the clutch C1 can temporarily be delayed. Thus, the possibility that the economic running cancellation condition is established in the state where the hydraulic pressure remains in the clutch C1 is increased. Accordingly, due to the remaining hydraulic pressure in the clutch C1, the amount of the hydraulic pressure that is used to bring the clutch C1 into the engaged state can be reduced. Thus, the transmission gear stage immediately after the cancellation of the economic running can further promptly be established. Just as described, upon cancellation from the economic running, the transmission gear stage can promptly be set.

In addition, according to this embodiment, before shifting the hydraulic pressure control command signals SP2 to 5, which are respectively transmitted to the linear solenoid valves SL2 to SL5 of the friction engagement elements other than the clutch C1, to the engagement side, the gear change control means 124 shifts the hydraulic pressure control command signal SP1 transmitted to the linear solenoid valve SL1 of the clutch C1 to the engagement side. Thus, the possibility that the clutch C1 is engaged again in the state where the hydraulic pressure remains in the clutch C1 is increased. In the case where the economic running cancellation condition is established in the state where the hydraulic pressure remains in the clutch C1, the clutch C1 is engaged in advance, and thus the hydraulic pressure tends to remain in the clutch C1. Due to the remaining hydraulic pressure in the clutch C1, the amount of the hydraulic pressure that is used to bring the clutch C1 into the engaged state can be reduced, and a surplus amount resulted from the reduction in the hydraulic pressure of the hydraulic pressure can be supplied as the hydraulic pressure that is used to bring the friction engagement element other than the clutch C1 into the engaged state. Thus, the desired transmission gear stage can promptly be set.

In addition, according to this embodiment, after shifting the hydraulic pressure control command signals SP2 to 5, which are respectively transmitted to the linear solenoid valves SL2 to SL5 of the friction engagement elements other than the clutch C1, to the disengagement side, the gear change control means 124 shifts the hydraulic pressure control command signal SP1 transmitted to the linear solenoid valve SL1 of the clutch C1 to the disengagement side. Accordingly, since the supply of the hydraulic pressure to the friction engagement elements other than the clutch C1 is blocked, the hydraulic pressure can be supplied to the clutch C1 in a concentrated manner, and the release of the hydraulic pressure from the clutch C1 can be delayed. Thus, the possibility that the economic running cancellation condition is established in the state where the hydraulic pressure remains in the clutch C1 is increased. In the case where the economic running cancellation condition is established in the state where the hydraulic pressure remains in the clutch C1, the amount of the hydraulic pressure that is used to bring the clutch C1 into the engaged state can be reduced due to the remaining hydraulic pressure in the clutch C1, and the surplus amount resulted from the reduction in the hydraulic pressure of the hydraulic pressure can be supplied as the hydraulic pressure that is used to bring the friction engagement element other than the clutch C1 into the engaged state. Thus, the desired transmission gear stage can promptly be set.

According to this embodiment, in the case where the economic running start condition is established, the gear change control means 124 supplies the hydraulic pressure that is accumulated in the accumulator to the clutch C1. Thus, the possibility that the economic running cancellation condition is established in the state where the hydraulic pressure remains in the clutch C1 is increased. In the case where the economic running cancellation condition is established in the state where the hydraulic pressure remains in the clutch C1, due to the remaining hydraulic pressure in the clutch C1, the amount of the hydraulic pressure that is used to bring the clutch C1 into the engaged state can be reduced, and the surplus amount resulted from the reduction in the hydraulic pressure of the hydraulic pressure can be supplied as the hydraulic pressure that is used to bring the friction engagement element other than the clutch C1 into the engaged state. Thus, the desired transmission gear stage can promptly be set.

Next, another embodiment of the invention will be described. It should be noted that, in the following description, components that are common to both of the embodiments are denoted by the same reference numerals and the description thereof will not be made.

Embodiment 2

In the above-described embodiment, in the determination of whether the friction engagement element other than the clutch C1 is completely disengaged by the disengagement determination means 136, if the disengagement determination is positive, the hydraulic pressure control command signal SP1, which is transmitted to the linear solenoid valve SL1 of the clutch C1, is shifted to the engagement side. By the way, in the case where the clutch C1 has already been completely disengaged, that is, the hydraulic pressure is released from the clutch C1 during the establishment of the economic running cancellation condition, a cancellation time for setting the transmission gear stage immediately after the cancellation of the economic running does not change regardless of whether the clutch C1, which is the friction engagement element for establishing the transmission gear stage immediately after the cancellation of the economic running in the engaged state, or the friction engagement element other than the clutch C1 is engaged first.

Thus, in this embodiment, in addition to the above-described embodiment, in the case where the disengagement determination is positive in the determination of whether the friction engagement element other than the clutch C1 is completely disengaged by the disengagement determination means 136, it is determined whether the clutch C1 is completely disengaged by the disengagement determination means 136. That is, it is determined whether the clutch C1 is completely disengaged after the complete disengagement of the friction engagement element other than the clutch C1 is positive.

More specifically, FIG. 9 is a flowchart for explaining a main part of a control operation of the electronic control unit 120 in this embodiment. The flowchart in FIG. 9 differs from the flowchart in FIG. 8 in that step S9 for determining whether the clutch C1 is completely disengaged is provided for S7, and, in the case where a determination of S9 is positive, S10 for shifting the hydraulic pressure control command signals SP2 to SP5 to the engagement side and S11 for shifting the hydraulic pressure control command signal SP1 to the engagement side are provided. The disengagement determination means 136 determines whether the clutch C1 is completely disengaged. For example, it is determined whether the clutch C1 is completely disengaged on the basis of whether the elapsed time since the hydraulic pressure control command signal SP1 to the linear solenoid valve SL1 of the clutch C1 is shifted has exceeded the specified elapsed time Tth. The above specified elapsed time Tth is a determination value that is obtained in advance by an experiment or the like to determine whether the hydraulic pressure of the clutch C1 is completely released.

In FIG. 9, the descriptions of S1 to S6 that do not differ from those in the flowchart in FIG. 8 will not be made. In S9 that corresponds to the disengagement determination means 136, it is determined whether the clutch C1 has completely been disengaged. It is sequentially determined whether the hydraulic pressure of the clutch C1 is completely released by determining whether the elapsed time since the hydraulic pressure control command signal SP1 to the linear solenoid valve SL1 of the clutch C1 is shifted to the disengagement side is longer than the specified time Tth, for example.

If the determination of this S9 is negative, in S7 that corresponds to the economic running control means 128, the gear change control means 124 shifts the hydraulic pressure control command signal SP1, which is transmitted to the linear solenoid valve SL1 of the clutch C1, to the engagement side, for example. Next, in S8 that corresponds to the gear change control means 124, for example, the gear change control means 124 shifts the hydraulic pressure control command signals SP2 to 5, which are respectively transmitted to the linear solenoid valves SL2 to 5 of the friction engagement elements other than the clutch C1, to the engagement side.

If the determination of S9 is positive, in S10 that corresponds to the economic running control means 128, for example, the gear change control means 124 shifts the hydraulic pressure control command signals SP2 to 5, which are respectively transmitted to the linear solenoid valves SL2 to 5 of the friction engagement elements other than the clutch C1, to the engagement side. Next, in S11 that corresponds to the gear change control means 124, for example, the gear change control means 124 shifts the hydraulic pressure control command signal SP1, which is transmitted to the linear solenoid valve SL1 of the clutch C1, to the engagement side.

As described above, according to this embodiment, when the economic running is cancelled, an order of engaging the friction engagement elements is changed in accordance with whether the clutch C1 is completely disengaged. In the case where the clutch C1 is not completely disengaged, the clutch C1 is engaged prior to the friction engagement element other than the clutch C1. In this way, the transmission gear stage immediately after the cancellation of the economic running can promptly be set. In the case where the clutch C1 is completely disengaged, the friction engagement element other than the clutch C1 with the small torque transmission capacity is engaged prior to the clutch C1 with the large torque transmission capacity. In this way, the control that prioritizes the suppression of the engagement shock can be executed.

The detailed description has been made so far on the embodiments of the invention on the basis of the drawings. However, the invention is also applied to other aspects.

For example, in the above-described embodiment, in the case where the economic running start condition is established when the gear stage GS is the fourth gear, the hydraulic pressure control command signals SP2 to 5, which are transmitted to the friction engagement elements other than the clutch C1, are shifted to the disengagement side prior to the signal to the clutch C1, the supply of the hydraulic pressure to the friction engagement elements other than the clutch C1 is blocked, and the supply amount of the hydraulic pressure to the clutch C1 is thereby increased. However, the invention is not limited to this embodiment. In the case where the economic running start condition is established when the gear stage GS is the sixth gear and where the economic running cancellation condition is established in the fifth gear, the supply amount of the hydraulic pressure to the clutch C2 that is common among the friction engagement elements for establishing the transmission gear stages of the sixth gear and lower may be increased, and the release of the hydraulic pressure from the clutch C2 may be delayed.

In addition, in the above-described embodiment, the gear change control means 124 may shift the hydraulic pressure control command signal SP1 to the engagement side before the hydraulic pressure control command signal SP1 to the clutch C1 obtains the disengagement steady-state value. In this way, the possibility that the economic running cancellation condition is established in the state where the hydraulic pressure remains in the clutch C1 is increased. In the case where the economic running cancellation condition is established in the state where the hydraulic pressure remains in the clutch C1, due to the remaining hydraulic pressure in the clutch C1, the amount of the hydraulic pressure that is used to bring the clutch C1 into the engaged state can be reduced, and the surplus amount resulted from the reduction in the hydraulic pressure of the hydraulic pressure can be supplied as the hydraulic pressure that is used to bring the friction engagement element other than the clutch C1 into the engaged state. Thus, the desired transmission gear stage can promptly be set.

In the above-described embodiment, the economic running control means 128 executes the economic running control at the "D" position of the shift lever 96. However, the economic running control may be executed at the "R" position of the shift lever 96. In this case, at least either one of the brake B2 and the brake B3, which are the friction engagement elements for achieving the reverse gear stage, is brought into the disengaged state. Even in the case where the economic running control is executed in such an "R" position, the invention can be applied.

In addition, the economic running determination means 126 may determine the start of the cancellation of the economic running control, in the case where a temperature of the clutch C1 reaches at least equal to a specified temperature at which durability of the clutch C1 is degraded, in the case where a state of being at least equal to the specified temperature continues for a specified time or longer, and the like. Various other conditions can be set to determine the start of the cancellation of the economic running control, just as described. It should be noted that the temperature of the clutch C1 may directly be detected by a temperature sensor or may be estimated from a difference in relative rotational speed of the clutch C1 in the slipped state, a slippage continuation time, or the like.

In the above-described embodiment, the automatic transmission 12 is an automatic transmission that can change the gear among the six forward gears and the one reverse gear. However, the number of the transmission gear stages and an internal structure of the automatic transmission are not particularly limited to those of the above-described automatic transmission 12. That is, the invention can be applied to an automatic transmission that can execute the economic running control and has a configuration to engage a specified engagement device when the economic running control is cancelled. In addition, the invention can be applied to a continuously variable transmission, such as a belt-type continuously variable transmission. It should be noted that, in the case of the belt-type continuously variable transmission or the like, the invention is applied, for example, to an engagement device that can connect/disconnect a power transmission passage between the engine and the belt-type continuously variable transmission, an engagement device that is provided in a well-known forward/reverse switching device, and the like.

In the above-described embodiment, the one-way clutch F1 is provided in parallel in the brake B2 for establishing the first gear stage "1st". However, the one-way clutch F1 does not always have to be provided.

In the above-described embodiment, the torque converter 32 that includes the lockup clutch 42 is used as a fluid-type transmission device. However, the lockup clutch 42 does not always have to be provided, and a fluid coupling with no torque amplifying action may be used.

In the above-described embodiment, the economic running during the deceleration is used as the example. However, the economic running during the stop may be used, or free running to bring the vehicle into the neutral state during the coasting travel and stopping the engine may be used.

The above-described plural embodiments can be implemented by combining together by assigning priorities or the like, for example.

It should be noted that what has been described above is merely one embodiment, and the invention can be implemented in the aspect in which various modifications and improvements are made thereto on the basis of knowledge of those skilled in the art.

What is claimed is:

1. A controller for a vehicle, the vehicle including a plurality of engagement elements for performing an engagement operation by hydraulic pressure, the plurality of engagement elements having a first engagement element and a second engagement element, a transmission gear state being established by i) engaging the first engagement element and ii) engaging the second engagement element, the first engagement element being an engagement element common to a plurality of transmission gear stages, the first engagement element being an engagement element to be brought into an engaged state for establishing a transmission gear stage immediately before a start of an economic running and a transmission gear stage immediately after cancellation of the economic running, the controller comprising
at least one electronic control unit configured to i) stop an engine and ii) switch the plurality of engagement elements between the engaged states and disengaged states, when a specified economic running start condition is established, such that the first engagement element is started to be switched from the engaged state to the disengaged state after the second engagement element is started to be switched from the engaged state to the disengaged state.

2. The controller according to claim 1 wherein
the electronic control unit is configured to switch a first command signal transmitted to a solenoid valve corresponding to the first engagement element and a second command signal transmitted to a solenoid valve corresponding to the second engagement element from signals for engagement to signals for disengagement when the specified economic running start condition is established such that the first command signal is switched from the signal for engagement to the signal for disengagement after the second command signal is switched from the signal for engagement to the signal for disengagement.

3. The controller according to claim 1 wherein
the electronic control unit is configured to switch a first command signal from a signal for disengagement to a signal for engagement when an economic running cancellation condition is established within a specified time since the first command signal, which is transmitted to a solenoid valve corresponding to the first engagement element, is shifted from the signal for engagement to the signal for disengagement after the specified economic running start condition is established.

4. The controller according to claim 1 wherein
the electronic control unit is configured to switch a first command signal transmitted to the first engagement element and a second command signal transmitted to the second engagement element from signals for disengagement to signals for engagement after an economic running cancellation condition is established such that the first command signal is switched from a signal for disengagement to a signal for engagement prior to the second command signal.

5. The controller according to claim 1 wherein
the vehicle includes solenoid valves configured to control a supply of the hydraulic pressure to the plurality of engagement elements,
a solenoid valve corresponding to the first engagement element is configured to supply the hydraulic pressure to the first engagement element when the specified economic running start condition is established, and
a solenoid valve corresponding to the second engagement element is configured to block the supply of the hydraulic pressure to the second engagement element when the specified economic running start condition is established.

6. The controller according to claim 1 wherein
the vehicle includes: an oil pump configured to supply the hydraulic pressure by rotary drive associated with rotation of the engine; and an accumulator configured to supply accumulated hydraulic pressure to the plurality of engagement elements, and
the accumulator is configured to supply the hydraulic pressure to the first engagement element when the specified economic running start condition is established.

* * * * *